(12) United States Patent
Chi et al.

(10) Patent No.: US 11,390,978 B2
(45) Date of Patent: Jul. 19, 2022

(54) DECELERATING CLUTCH OF A WASHING MACHINE, AND WASHING MACHINE

(71) Applicant: QINGDAO HAIER DRUM WASHING MACHINE CO., LTD., Shandong (CN)

(72) Inventors: Zongrui Chi, Shandong (CN); Houli Luan, Shandong (CN); Long Yang, Shandong (CN)

(73) Assignee: QINGDAO HAIER DRUM WASHING MACHINE CO., LTD., Shandong (CN)

( * ) Notice: Subject to any disclaimer, the term of this patent is extended or adjusted under 35 U.S.C. 154(b) by 367 days.

(21) Appl. No.: 16/493,957

(22) PCT Filed: Mar. 8, 2018

(86) PCT No.: PCT/CN2018/078400
§ 371 (c)(1),
(2) Date: Sep. 13, 2019

(87) PCT Pub. No.: WO2018/166396
PCT Pub. Date: Sep. 20, 2018

(65) Prior Publication Data
US 2020/0018390 A1 Jan. 16, 2020

(30) Foreign Application Priority Data
Mar. 14, 2017 (CN) .......................... 201710150971.8

(51) Int. Cl.
*D06F 37/30* (2020.01)
*F16H 57/021* (2012.01)
*F16H 57/10* (2006.01)

(52) U.S. Cl.
CPC ........... *D06F 37/30* (2013.01); *F16H 57/021* (2013.01); *F16H 57/10* (2013.01)

(58) Field of Classification Search
CPC ......... D06F 37/30; F16H 57/021; F16H 57/10
(Continued)

(56) References Cited

U.S. PATENT DOCUMENTS

2016/0130739 A1    5/2016  Song

FOREIGN PATENT DOCUMENTS

| CN | 1664395 A | 9/2005 |
|---|---|---|
| CN | 103628279 A | 3/2014 |

(Continued)

OTHER PUBLICATIONS

CN105063965A—machine translation (Year: 2015).*
(Continued)

*Primary Examiner* — Tinsae B Ayalew
(74) *Attorney, Agent, or Firm* — Buchanan Ingersoll & Rooney PC

(57) ABSTRACT

A decelerating clutch of a washing machine includes a bearing seat, an input shaft, an output shaft, and an output shaft sleeve. The input shaft and the output shaft are arranged coaxially. The output shaft sleeve is sleeved on the input shaft and the output shaft. The output shaft sleeve rotates relative to the input shaft. The output shaft sleeve is connected with the input shaft via a planetary gear train. The output shaft sleeve is installed on the bearing seat via a bearing. The bearing seat and the output shaft sleeve are respectively provided with locating structures coordination with the bearings, and the locating structures axially limit movement of the output shaft sleeve relative to the bearing seat. As to the decelerating clutch of a washing machine, two-way limit to a bearing is realized, thereby effectively avoiding axial movement of the output shaft sleeve.

9 Claims, 2 Drawing Sheets

(58) Field of Classification Search
USPC .......................................................... 68/140
See application file for complete search history.

(56) References Cited

FOREIGN PATENT DOCUMENTS

| | | |
|---|---|---|
| CN | 105063965 A | 11/2015 |
| CN | 105316905 A | 2/2016 |
| CN | 205874770 U | 1/2017 |
| CN | 107044033 A | 8/2017 |
| CN | 107227585 A | 10/2017 |

OTHER PUBLICATIONS

International Search Report (PCT/ISA/210) dated May 31, 2018, by the Chinese Patent Office as the International Searching Authority for International Application No. PCT/CN2018/078400.
Written Opinion (PCT/ISA/237) dated May 31, 2018, by the Chinese Patent Office as the International Searching Authority for International Application No. PCT/CN2018/078400.
European Search Opinion issued in European Patent Application No. 18766853; dated Jan. 27, 2020 (4 pages).
Notice of Reasons for Refusal issued in Japanese Patent Application No. 2019-550572; dated Feb. 10, 2021, with English Translation (8 pages).

* cited by examiner

DECELERATING CLUTCH OF A WASHING MACHINE, AND WASHING MACHINE

TECHNICAL FIELD

The present disclosure relates to laundry equipment, in particular to a decelerating clutch of a washing machine and a washing machine.

BACKGROUND ART

The existing decelerating clutch of a washing machine generally only limits movement of an inner barrel shaft towards one side of a motor, when an inner barrel is static, due to an effect of gravity of an inner barrel, an inner barrel shaft generally will not move towards another side, however, during operation of a washing machine, since an inner barrel constantly vibrates during rotation, an inner barrel shaft which is not completely located will easily move up and down, thereby leading to collision between an inner barrel and an outer barrel, and generating bigger noise, meanwhile, a bearing of the original decelerating clutch of a washing machine is not subjected to a uniform force, thereby greatly shortening service life of the whole decelerating clutch.

In view of this, the present disclosure is hereby proposed.

SUMMARY

An object of the present disclosure is to overcome shortcomings of the prior art, and provide a decelerating clutch of a washing machine which has a long service life and can prevent movement of an inner barrel.

Another object of the present disclosure is to provide a washing machine which is configured with the above decelerating clutch of a washing machine.

In order to realize the object, the present disclosure adopts the following technical solution:

A decelerating clutch of a washing machine, comprising: a bearing seat, an input shaft, an output shaft, and an output shaft sleeve, wherein the input shaft and the output shaft are arranged coaxially, the output shaft sleeve is sleeved on the input shaft and the output shaft, the output shaft sleeve is configured to rotate relative to the input shaft, and the output shaft sleeve is connected with the input shaft in a transmission manner via a planetary gear train, the output shaft sleeve is installed on the bearing seat via a bearing, the bearing seat and the output shaft sleeve are respectively provided with locating structures for being coordinated with the bearing and the locating structures are configured to axially limit movement of the output shaft sleeve relative to the bearing seat.

Further, at least one pair of bearings are provided, and correspondingly arranged at two ends of the output shaft sleeve; two first locating structures are arranged on the output shaft sleeve, and are respectively arranged at different sides of two bearings; and two second locating structures are also arranged on the bearing seat, and are arranged at another side of the bearing corresponding to the two first locating structures on the output shaft sleeve, to limit axial movement of the bearing.

Further, a first bearing and a second bearing are provided, the first bearing is coordinated with one second locating structure of the bearing seat, to limit movement of the first bearing towards the second bearing, and the second bearing is coordinated with another second locating structure of the bearing seat, to limit movement of the second bearing towards the first bearing.

Further, the output shaft sleeve comprises an inner barrel shaft, a brake wheel, and an oil seal cover, the inner barrel shaft and the oil seal cover are respectively fixedly connected with the brake wheel, the first bearing is installed on the inner barrel shaft, and the second bearing is installed on the oil seal cover, the inner barrel shaft and the oil seal cover are respectively provided with a third locating structure to be in fit with an inner ring of the first bearing and an inner ring of the second bearing to limit movement of the inner ring of the bearing in an opposite direction along an axial direction.

Further, the third locating structure on the inner barrel shaft is a step surface, one end face of the inner ring of the first bearing is abutted against the step surface, the third locating structure on the oil seal cover is a C-shaped check ring clamped on the oil seal cover, and the C-shaped check ring is arranged on a side, far away from the inner barrel shaft, of the second bearing, and is in contact with one end face of the inner ring of the second bearing.

Further, the oil seal cover is provided with an annular groove, and the C-shaped check ring is clamped in the annular groove.

Further, one end of the inner barrel shaft is inserted into the brake wheel, a C-shaped check ring is clamped at an end part, located in the brake wheel, of the inner barrel shaft, and the C-shaped check ring is abutted against an inner side of the brake wheel, to limit the end part of the inner barrel shaft within the brake wheel.

Further, each of the two second locating structures on the bearing seat comprises locating surfaces being in contact with an end face of an outer ring of the first bearing or an end face of an outer ring of the second bearing, the locating surfaces comprise a first locating surface and a second locating surface, the first locating surface is in contact with the end face, close to the second bearing, of the first bearing, and the second locating surface is in contact with the end face, close to the first bearing, of the second bearing.

Further, a first bearing seat and a second bearing seat are provided, the first bearing seat and the second bearing seat are fixedly connected to form a cavity for accommodating the output shaft and the output shaft sleeve, and the first locating surface is arranged on the first bearing, and the second locating surface is arranged on the second bearing.

In order to realize the second object, the present disclosure adopts the following technical solution:

A washing machine configured with the above decelerating clutch of a washing machine is provided.

After the technical solutions of the present disclosure are adopted, the following beneficial effects are brought about:

As to the decelerating clutch of a washing machine of the present disclosure, two-way limit to a bearing is realized, thereby effectively avoiding axial movement of an output shaft sleeve, reducing noise of a washing machine during operation, and avoiding collision between an inner barrel and an outer barrel in a rotating process of an inner barrel. On the other hand, the bearing in the decelerating clutch is subjected to a more uniform force, therefore, the service life is longer, and the maintenance cost is lowered. During operation of a washing machine of the present disclosure, the noise is low, and the user experience is better.

Figure 1:
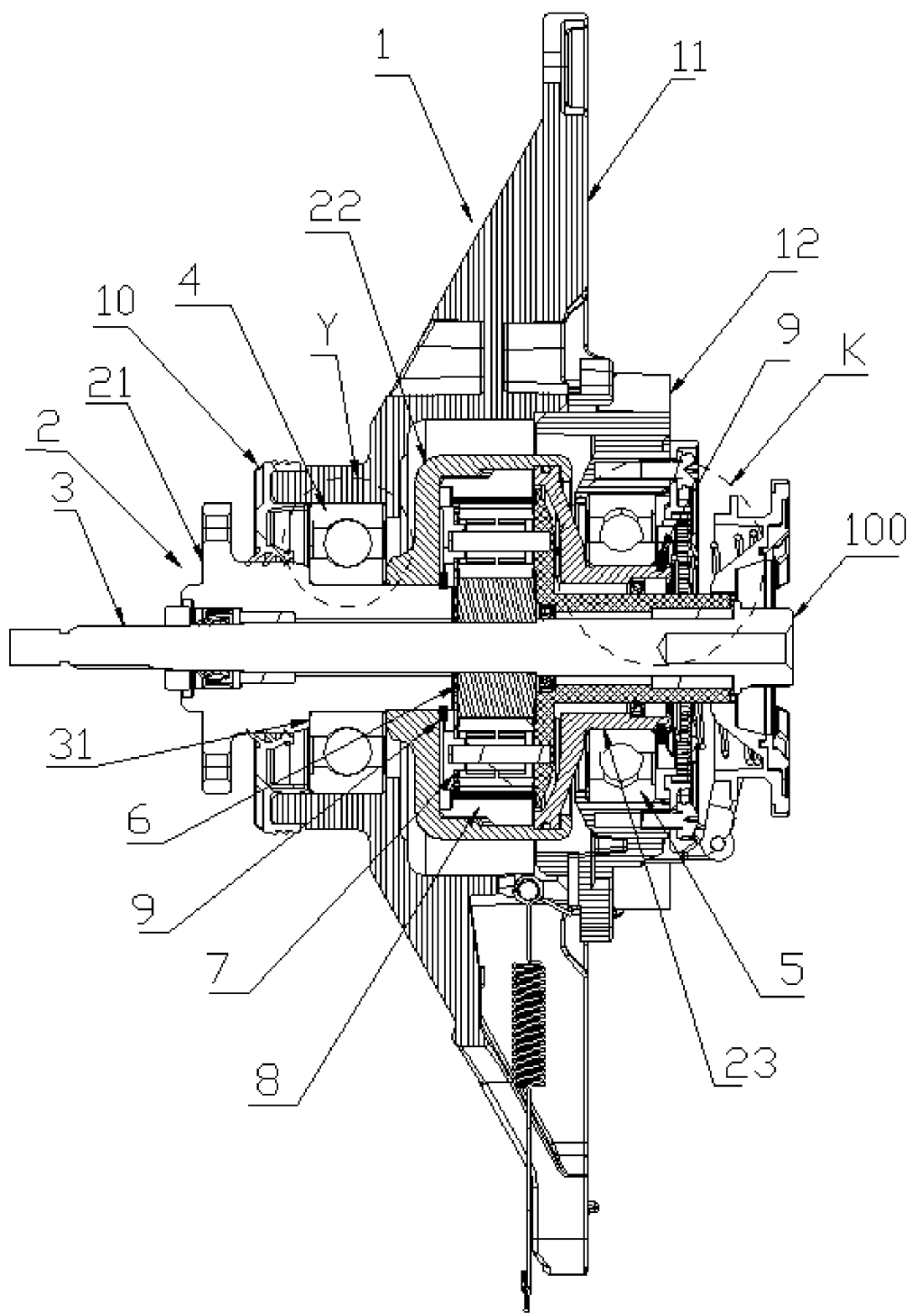
FIG. 1 is a structural sectional view of the present disclosure.

REFERENCE NUMERALS IN THE FIGURES 1, bearing seat; 2, output shaft sleeve; 3, output shaft; 4, first bearing; 5, second bearing; 6, sun gear; 7, planet gear; 8, outer tooth ring; 9, C-shaped check ring; 10, big oil seal; 11, first bearing seat; 12, second bearing seat; 13, first locating surface; 14, second locating surface; 21, inner barrel shaft; 22, brake wheel; 23, oil seal cover; 31, step surface; 100, input shaft.

DETAILED DESCRIPTION OF THE EMBODIMENTS

A further detailed description will be given below on specific embodiments of the present disclosure in combination with accompanying drawings.

Figure 2:
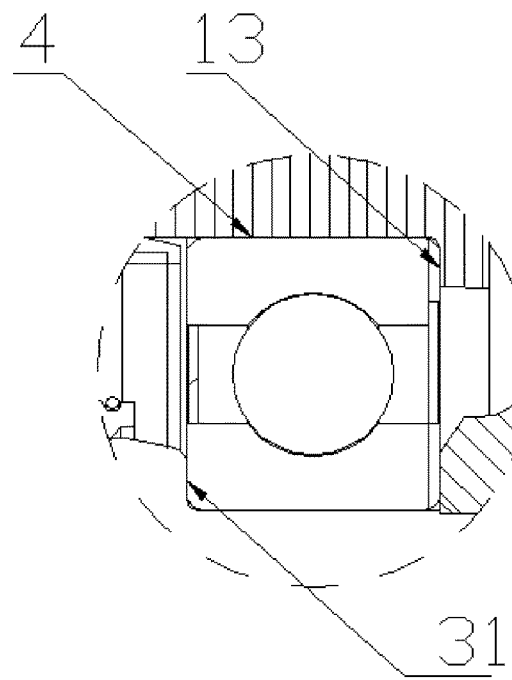
FIG. 2 is a partial enlarged view of Y of FIG. 1.

As shown in FIG. 1 and FIG. 2, a decelerating clutch of a washing machine includes a bearing seat 1, an input shaft 100, an output shaft 3, and an output shaft sleeve 2, wherein the input shaft 100 and the output shaft 3 are arranged coaxially, the output shaft sleeve 2 is sleeved on the input shaft 100 and the output shaft 3. Preferably, the input shaft 100 and the output shaft 3 are configured to a through-shaft, and they are of an integrated structure. The output shaft sleeve 2 is configured to rotate relative to the input shaft 100, and the output shaft sleeve 2 is connected with the input shaft 100 in a transmission manner via a planetary gear train. The input shaft 100 is connected with a motor shaft, the output shaft 3 is connected with an impeller in an inner barrel, and the output shaft sleeve 2 is connected with an inner barrel to drive rotation of an inner barrel. The output shaft sleeve 2 is installed on the bearing seat 1 via a bearing, and can rotate relative to the bearing seat 1, and the bearing seat 1 is configured to support the output shaft sleeve 2. The bearing seat 1 and the output shaft sleeve 2 are respectively provided with locating structures for being coordinated with the bearings, and the locating structures are configured to axially limit movement of an output shaft sleeve 2 relative to the bearing seat 1. Through mutual coordination between locating structures, axial movement of the output shaft sleeve 2 is limited, that is, the output shaft sleeve 2 cannot move axially, or only tiny movement is allowed. Since the output shaft sleeve 2 is connected with an inner barrel, axial movement of an inner barrel is further limited, and the inner barrel can be enabled to operate more stably.

Specifically, the output shaft sleeve 2 includes an inner barrel shaft 21, a brake wheel 22 and an oil seal cover 23, wherein the inner barrel shaft 21 and the oil seal cover 23 are respectively arranged at two sides of the brake wheel 22, and are fixedly connected with the brake wheel 22, and the three moves synchronously. The inner barrel shaft 21 is fixedly connected with an inner barrel, a planetary gear train is set within the brake wheel 22, and includes a sun gear 6 which is fixedly installed on the input shaft 100, a planet gear 7 which is meshed with the sun gear 6 and installed on a planet carrier, and an outer tooth ring 8, wherein an outer ring of the outer tooth ring 8 is fixedly connected with an inner wall of the brake wheel 22, an inner side of the outer tooth ring 8 is meshed with the planet gear 7, and when the sun gear 6 rotates, the outer tooth ring 8 can be driven to rotate through the planet gear 7, and further the brake wheel 22 is rotated.

At least one pair of bearings are provided, and correspondingly arranged at two ends of an output shaft sleeve 2; preferably, one pair of bearings are provided, but multiple pairs of bearings can also be arranged, and the multiple pairs of bearings can be arranged at two ends of the output shaft sleeve 2 in a combined manner. Two locating structures are arranged on the output shaft sleeve 2, and are respectively arranged at different sides of two bearings, for example, one of the locating structures is located on a left side of a bearing, while another locating structure is located on a right side of another bearing. Specifically, one of the locating structures is formed on the inner barrel shaft 21, while another locating structure is arranged on the oil seal cover 23.

Two locating structures are also arranged on the bearing seat 1, and are arranged on another side of the bearing corresponding to the two locating structures on the output shaft sleeve 2, to limit axial movement of the bearing. Through coordination of the above two locating structures, axial movement of the output shaft sleeve 2 is completely limited, or only tiny movement is allowed, that is, the output shaft sleeve 2 cannot move towards one side of a motor, and cannot move towards one side of an inner barrel either. A first bearing 4 and a second bearing 5 are provided, the first bearing 4 is coordinated with a locating structure of the bearing seat 1, to limit movement of the first bearing 4 towards a direction of the second bearing 5, and the second bearing 5 is coordinated with another locating structure of the bearing seat 1, to limit movement of the second bearing 5 towards a direction of the first bearing 4.

An inner ring of the bearing is in contact with the output shaft sleeve 2, and an outer ring is in contact with the bearing seat 1. Specifically, an inner ring of a bearing is in interference fit with the output shaft sleeve 2, and an outer ring of a bearing is in interference fit with a bearing seat 1. Preferably, the bearing is a ball bearing.

Specifically, the first bearing 4 is installed on the inner barrel shaft 21, and the second bearing 5 is installed on an oil seal cover 23. The inner barrel shaft 21 and the oil seal cover 23 are respectively in location fit with an inner ring of the bearing, and limit movement of an inner ring of the bearing in an opposite direction along an axial direction.

Preferably, a locating structure on the inner barrel shaft 21 is a step surface 31, a left end face of an inner ring of the first bearing 4 is abutted against the step surface 31, such that the first bearing 4 cannot move leftwards relative to the inner barrel shaft 21. A locating structure on the oil seal cover 23 is a C-shaped check ring 9 clamped on the oil seal cover 23, the C-shaped check ring 9 is arranged on a right side of the second bearing 5, and is in contact fit with a right end face of an inner ring of the second bearing 5, such that the second bearing 5 cannot move rightwards relative to the oil seal cover 23.

Figure 3:
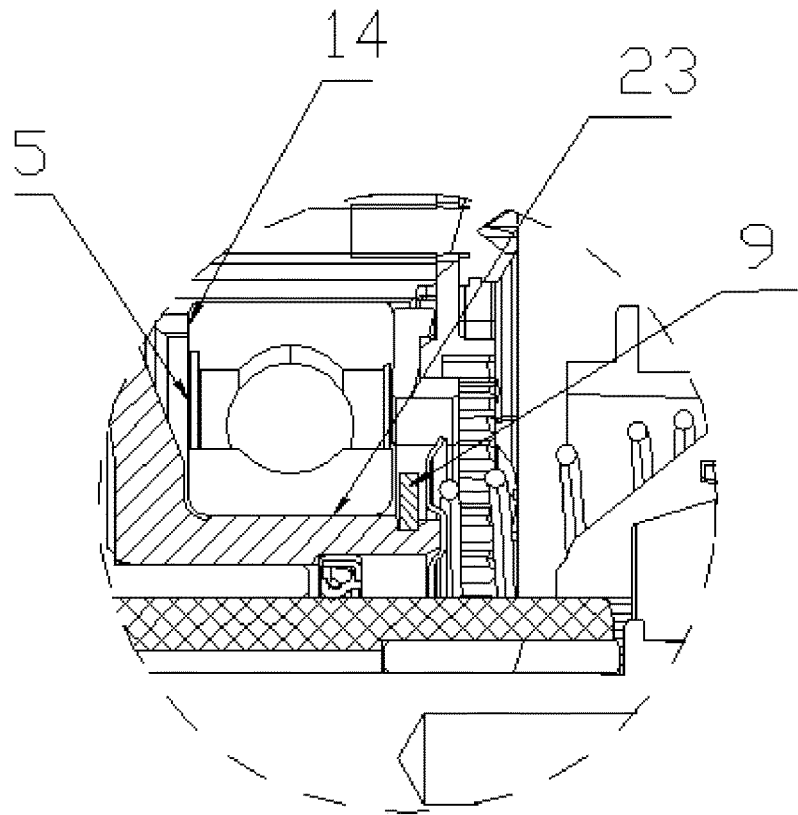
FIG. 3 is a partial enlarged view of K of FIG. 1.

As shown in FIG. 1-FIG. 3, the bearing seat 1 includes a first bearing seat 11 and a second bearing seat 12; the first bearing seat 11 and the second bearing seat 12 are fixedly connected, and form a mold cavity which accommodates an output shaft 3 and the output shaft sleeve 2. A locating structure on the bearing seat 1 is a locating surface which is in contact with an end face of an outer ring of a bearing, and the locating surface includes a first locating surface 13 and a second locating surface 14. The first locating surface 13 is arranged on the first bearing 4, and the second locating surface 14 is arranged on the second bearing 5. The first locating surface 13 is in contact fit with a right end face of the first bearing 4, such that the first bearing 4 cannot move rightwards relative to the first bearing 4, and the second locating surface 14 is in contact fit with a left end face of the second bearing 5, such that the second bearing 5 cannot move leftwards relative to the second bearing 5. In this way, when the output shaft sleeve 2 moves towards a direction of a motor, the output shaft sleeve 2 will be limited by the first locating surface 13, and when the output shaft sleeve 2 moves towards a direction of an inner barrel, the output shaft sleeve 2 will be limited by the second locating surface 14. Therefore, the output shaft sleeve 2 cannot move axially within the bearing seat 1.

Preferably, the oil seal cover 23 is provided with an annular groove, the C-shaped check ring 9 is clamped in the groove, and the width of the groove is the same as or slightly bigger than the thickness of the C-shaped check ring 9.

As to another embodiment of the present disclosure, one end of the inner barrel shaft 21 is inserted into the brake wheel 22, to avoid relative movement of the inner barrel shaft 21 and the brake wheel 22, the inner barrel shaft 21 is in interference fit with the brake wheel 22, further, a C-shaped check ring 9 is clamped at an end, located in the brake wheel 22, of the inner barrel shaft 21, and the C-shaped check ring 9 is abutted against an inner side of the brake wheel 22, to limit an end part of the inner barrel shaft 21 within the brake wheel 22, and prevent the inner barrel shaft 21 from slipping from the brake wheel 22. Preferably, an end part of the brake wheel 22 can be abutted against a right side of the first bearing 4, and is set relative to a step surface on the inner barrel shaft 21.

A big oil seal 10 is further arranged between the inner barrel shaft 21 and the first bearing seat 11, an end cover is further arranged between the output shaft 3 and the second bearing seat 12, and a mold cavity which is formed between the first bearing seat 11 and the second bearing seat 12 is sealed, to prevent dust from entering the mold cavity.

When a decelerating clutch of the present disclosure is used, when the output shaft sleeve 2 moves towards one side of an inner barrel, a C-shaped check ring 9 on the oil seal cover 23 will touch a right end face of a second bearing 5, since a left end face of the second bearing 5 is located by the second locating surface 14, the output shaft sleeve 2 cannot move towards one side of an inner barrel, when the output shaft sleeve 2 moves towards one side of a motor, a step surface 31 of the inner barrel shaft 21 will touch a left end face of a first bearing 4, since a right end face of the first bearing 4 is located by the first locating surface 13, the output shaft sleeve 2 cannot move towards one side of a motor.

The present disclosure further provides a washing machine configured with the above decelerating clutch of a washing machine. The decelerating clutch is installed between an inner barrel and a motor.

Those skilled in the art should also understand that, such terms as "left" and "right" used in embodiments of the present disclosure for indicating orientation or positional relationship are based on the status of accompanying drawings, and these terms are merely for the convenience of description and understanding of technical solutions of the present disclosure, rather than for indicating or implying that the device or element referred to must be located in a certain orientation or must be constructed or operated in a certain orientation, therefore the terms cannot be understood as a limitation to the present disclosure.

What is described above is embodiments of the present disclosure. It should be noted that, for those skilled in the art, under a premise of not departing from principles of the present disclosure, various transformations and improvements can also be made, and such transformations and improvements shall also be deemed to fall within the protection scope of the present disclosure.

The invention claimed is:

1. A decelerating clutch of a washing machine, comprising:
   a bearing seat;
   an input shaft;
   an output shaft including an inner barrel shaft, a brake wheel and an oil seal cover;
   an output shaft sleeve,
   wherein the input shaft and the output shaft are arranged coaxially, the output shaft sleeve is sleeved on the input shaft and the output shaft,
   the output shaft sleeve is configured to rotate relative to the input shaft, and the output shaft sleeve is connected with the input shaft in a transmission manner via a planetary gear train,
   the output shaft sleeve is installed on the bearing seat via a first bearing and a second bearing, the bearing seat and the output shaft sleeve are respectively provided with locating structures for being coordinated with the first and second bearings and the locating structures are configured to axially limit movement of the output shaft sleeve relative to the bearing seat;
   the first bearing having an inner ring;
   the second bearing having an inner ring;
   wherein the inner barrel shaft includes a step surface, one end face of the inner ring of the first bearing abuts against the step surface, a first C-shaped check ring clamped on the oil seal cover, the first C-shaped check ring is arranged on a side away from the inner barrel shaft and is in contact with one end face of the inner ring of the second bearing, the step surface and the first C-shaped check ring limiting movement of the first bearing and the second bearing in opposite axial directions.

2. The decelerating clutch of a washing machine of claim 1, wherein the first bearing and the second bearing are correspondingly arranged at two ends of the output shaft sleeve;
   two first locating structures are arranged on the output shaft sleeve, and are respectively arranged at different sides of the first bearing and the second bearing; and
   two second locating structures are also arranged on the bearing seat, and are arranged at another side of the bearing corresponding to the two first locating structures on the output shaft sleeve, to limit axial movement of the bearing.

3. The decelerating clutch of a washing machine of claim 2, wherein
   the first bearing is coordinated with one second locating structure of the bearing seat, to limit movement of the first bearing towards the second bearing, and
   the second bearing is coordinated with another second locating structure of the bearing seat, to limit movement of the second bearing towards the first bearing.

4. The decelerating clutch of a washing machine of claim 3, wherein
   the inner barrel shaft and the oil seal cover are respectively fixedly connected with the brake wheel, and
   the first bearing is installed on the inner barrel shaft, and the second bearing is installed on the oil seal cover.

5. The decelerating clutch of a washing machine of claim 1, wherein the oil seal cover is provided with an annular groove, and the first C-shaped check ring is clamped in the annular groove.

6. The decelerating clutch of a washing machine of claim 4, wherein one end of the inner barrel shaft is inserted into the brake wheel, a second C-shaped check ring is clamped at an end part, located in the brake wheel, of the inner barrel shaft, and the second C-shaped check ring is abutted against an inner side of the brake wheel, to limit the end part of the inner barrel shaft within the brake wheel.

7. The decelerating clutch of a washing machine of claim 3, wherein each of the two second locating structures on the bearing seat comprises locating surfaces being in contact with an end face of an outer ring of the first bearing or an end face of an outer ring of the second bearing, the locating surfaces comprise a first locating surface and a second locating surface, the first locating surface is in contact with an end face on a side of the second bearing of the first bearing, and the second locating surface is in contact with an end face on a side of the first bearing of the second bearing.

8. The decelerating clutch of a washing machine of claim 7, wherein the bearing seat includes a first bearing seat and a second bearing seat, the first bearing seat and the second bearing seat are fixedly connected to form a cavity for accommodating the output shaft and the output shaft sleeve, and the first locating surface is arranged on the first bearing, and the second locating surface is arranged on the second bearing.

9. A washing machine configured with the decelerating clutch of a washing machine of claim 1.

* * * * *